US009715607B2

(12) United States Patent
Rostami

(10) Patent No.: US 9,715,607 B2
(45) Date of Patent: *Jul. 25, 2017

(54) APPARATUS AND METHODS FOR COMMUNICATING POWER AND DATA WITH ELECTRONIC DEVICES

(75) Inventor: Ramin Rostami, Calabasas, CA (US)

(73) Assignee: Advanced Wireless Innovations LLC

( * ) Notice: Subject to any disclaimer, the term of this patent is extended or adjusted under 35 U.S.C. 154(b) by 97 days.

This patent is subject to a terminal disclaimer.

(21) Appl. No.: 13/342,936

(22) Filed: Jan. 3, 2012

(65) Prior Publication Data

US 2012/0191895 A1   Jul. 26, 2012

Related U.S. Application Data

(63) Continuation-in-part of application No. 13/024,310, filed on Feb. 9, 2011.

(60) Provisional application No. 61/303,354, filed on Feb. 11, 2010, provisional application No. 61/375,847, filed on Aug. 22, 2010, provisional application No. 61/450,122, filed on Mar. 7, 2011.

(51) Int. Cl.
  *G06F 13/20*   (2006.01)
  *G06K 7/10*    (2006.01)

(52) U.S. Cl.
  CPC .............. *G06K 7/10158* (2013.01)

(58) Field of Classification Search
  USPC ................................ 710/313, 315
  See application file for complete search history.

(56) References Cited

U.S. PATENT DOCUMENTS

| | | | |
|---|---|---|---|
| 4,252,007 A * | 2/1981 | Kerley | 70/58 |
| 4,564,767 A | 1/1986 | Charych | |
| 4,672,228 A | 6/1987 | Swoboda | |
| 4,860,185 A | 8/1989 | Brewer et al. | |
| 4,908,790 A | 3/1990 | Little et al. | |
| 5,237,258 A | 8/1993 | Crampton | |
| 5,243,269 A | 9/1993 | Katayama et al. | |
| 5,369,565 A | 11/1994 | Chen et al. | |
| 5,608,273 A | 3/1997 | Bartlett | |
| 5,689,412 A | 11/1997 | Chen | |
| 5,717,309 A | 2/1998 | Cho | |
| 5,847,545 A | 12/1998 | Chen et al. | |
| 5,963,140 A | 10/1999 | Kawaguchi et al. | |
| 6,194,867 B1 | 2/2001 | Cummings et al. | |
| 6,211,649 B1 | 4/2001 | Matsuda | |
| 6,285,091 B1 | 9/2001 | Chan et al. | |

(Continued)

FOREIGN PATENT DOCUMENTS

| CN | 201142584 Y | 10/2008 |
|---|---|---|
| EP | 1746506 * | 1/2007 |

OTHER PUBLICATIONS

"FuelTank from CallPod: Charge Two Phones with One Charger." *Ipod and Iphone: Ipod and Iphone Accessories*. Nov. 15, 2008. Web. May 10, 2016.

(Continued)

*Primary Examiner* — Elias Mamo
(74) *Attorney, Agent, or Firm* — Mintz Levin Cohn Ferris Glovsky and Popeo, P.C.

(57) ABSTRACT

Embodiments of a system, topology, and methods for providing power and transceiving data to, and backing up data from electronic devices having a data interface are described generally herein. Other embodiments may be described and claimed.

20 Claims, 11 Drawing Sheets

(56) References Cited

U.S. PATENT DOCUMENTS

| | | |
|---|---|---|
| 6,304,006 B1 | 10/2001 | Jungreis |
| 6,404,168 B1 | 6/2002 | Shoji |
| 6,437,549 B1 | 8/2002 | Takagishi |
| 6,455,954 B1 | 9/2002 | Dailey |
| 6,459,175 B1 | 10/2002 | Potega |
| 6,465,984 B2 | 10/2002 | Fukuoka et al. |
| 6,483,204 B2 | 11/2002 | Hanaki |
| 6,693,810 B2 | 2/2004 | Robinson et al. |
| 6,741,064 B2 | 5/2004 | Liu et al. |
| 6,774,603 B2 | 8/2004 | Liao |
| 6,831,444 B2 | 12/2004 | Kobayashi et al. |
| 6,885,115 B2 | 4/2005 | Hatori et al. |
| 7,013,163 B2 | 3/2006 | Jaggers et al. |
| 7,573,159 B1 | 8/2009 | DeIuliis et al. |
| 7,642,671 B2 | 1/2010 | Mahaffey |
| 7,753,713 B2 | 7/2010 | Neale, III |
| 7,755,323 B2 | 7/2010 | Wu |
| 7,832,645 B2 | 11/2010 | Chen et al. |
| 7,855,528 B2 | 12/2010 | Lee |
| 8,107,243 B2 | 1/2012 | Guccione et al. |
| 8,143,850 B2 | 3/2012 | Erickson |
| 8,169,105 B2 | 5/2012 | Rostami |
| 8,310,087 B2 | 11/2012 | Rostami |
| 8,358,107 B2 | 1/2013 | Nguyen |
| 8,368,346 B2 | 2/2013 | Batson et al. |
| 8,487,476 B2 | 7/2013 | Rostami |
| 8,766,476 B2 | 7/2014 | Rostami |
| 9,325,204 B2 | 4/2016 | Rostami |
| 2003/0230934 A1 | 12/2003 | Cordelli et al. |
| 2004/0073820 A1 | 4/2004 | Hsu |
| 2004/0104707 A1* | 6/2004 | May et al. ............ 320/136 |
| 2004/0178679 A1 | 9/2004 | Kabasawa |
| 2004/0204179 A1 | 10/2004 | Hsu |
| 2005/0017685 A1 | 1/2005 | Rees et al. |
| 2005/0077869 A1 | 4/2005 | Yueh |
| 2005/0104557 A1 | 5/2005 | Chang |
| 2005/0174094 A1* | 8/2005 | Purdy et al. |
| 2005/0225292 A1 | 10/2005 | Damlamian et al. |
| 2006/0158154 A1* | 7/2006 | Maurilus ........... H04M 1/72527 320/115 |
| 2007/0032098 A1 | 2/2007 | Bowles et al. |
| 2007/0080663 A1 | 4/2007 | Obering |
| 2007/0205908 A1 | 9/2007 | Du et al. |
| 2007/0247105 A1 | 10/2007 | Krieger et al. |
| 2007/0273326 A1 | 11/2007 | Krieger et al. |
| 2008/0231233 A1 | 9/2008 | Thornton |
| 2009/0079392 A1 | 3/2009 | Wu |
| 2009/0089496 A1 | 4/2009 | Huang |
| 2009/0265396 A1* | 10/2009 | Ram et al. .................... 707/204 |
| 2009/0267562 A1 | 10/2009 | Guccione et al. |
| 2009/0273316 A1 | 11/2009 | Lee |
| 2009/0302802 A1 | 12/2009 | Miyazaki et al. |
| 2010/0231161 A1 | 9/2010 | Brown |
| 2010/0262845 A1 | 10/2010 | Goel |
| 2011/0074340 A1* | 3/2011 | Kao ..................... H02J 7/0045 320/107 |
| 2011/0197010 A1 | 8/2011 | Rostami |
| 2014/0306539 A1 | 10/2014 | Rostami |

OTHER PUBLICATIONS

Haselton, Todd. "Powertraveller Powergorilla Review." *Laptop Mag*. Tom's Guide, Feb. 23, 2009. Web. May 10, 2016.

* cited by examiner

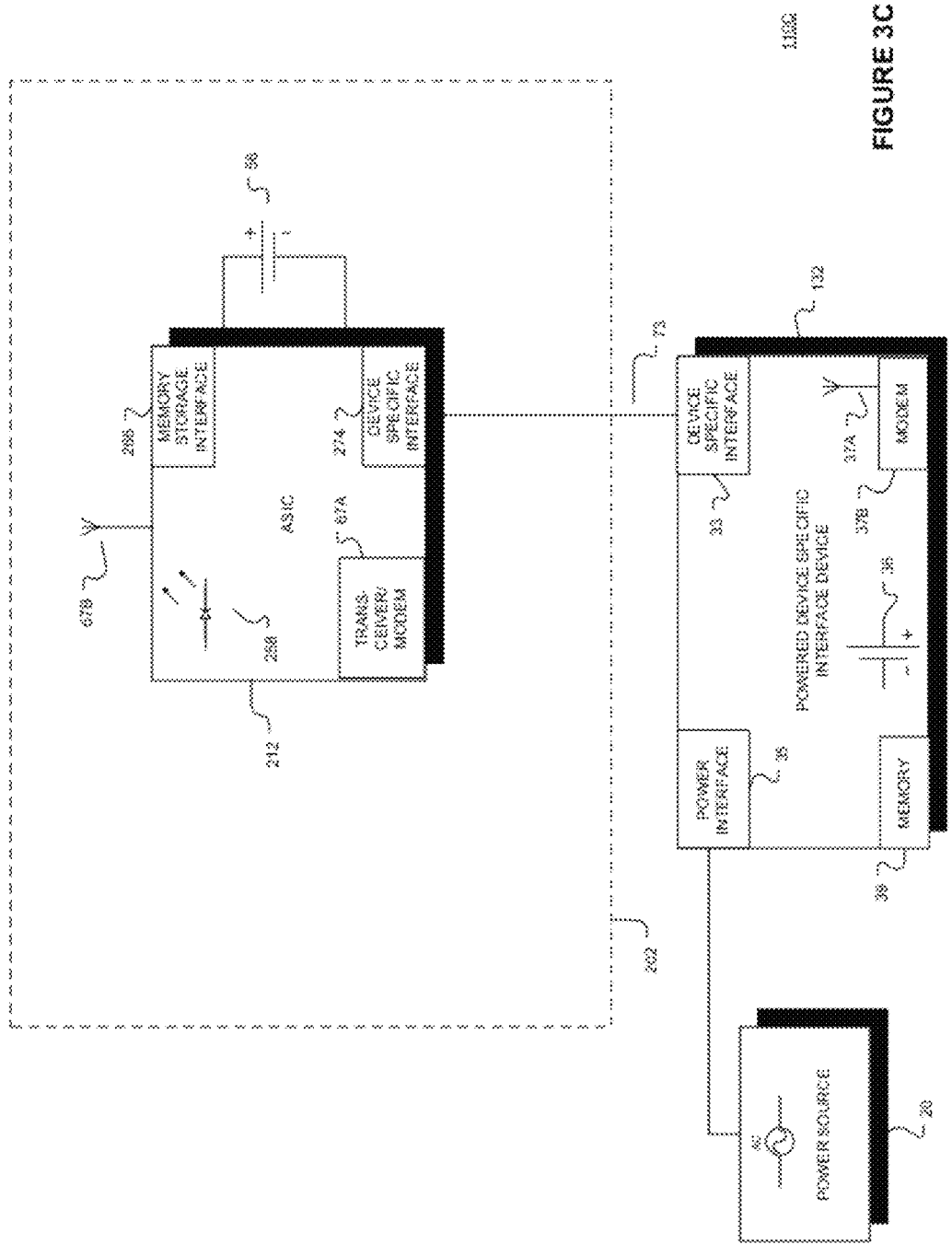

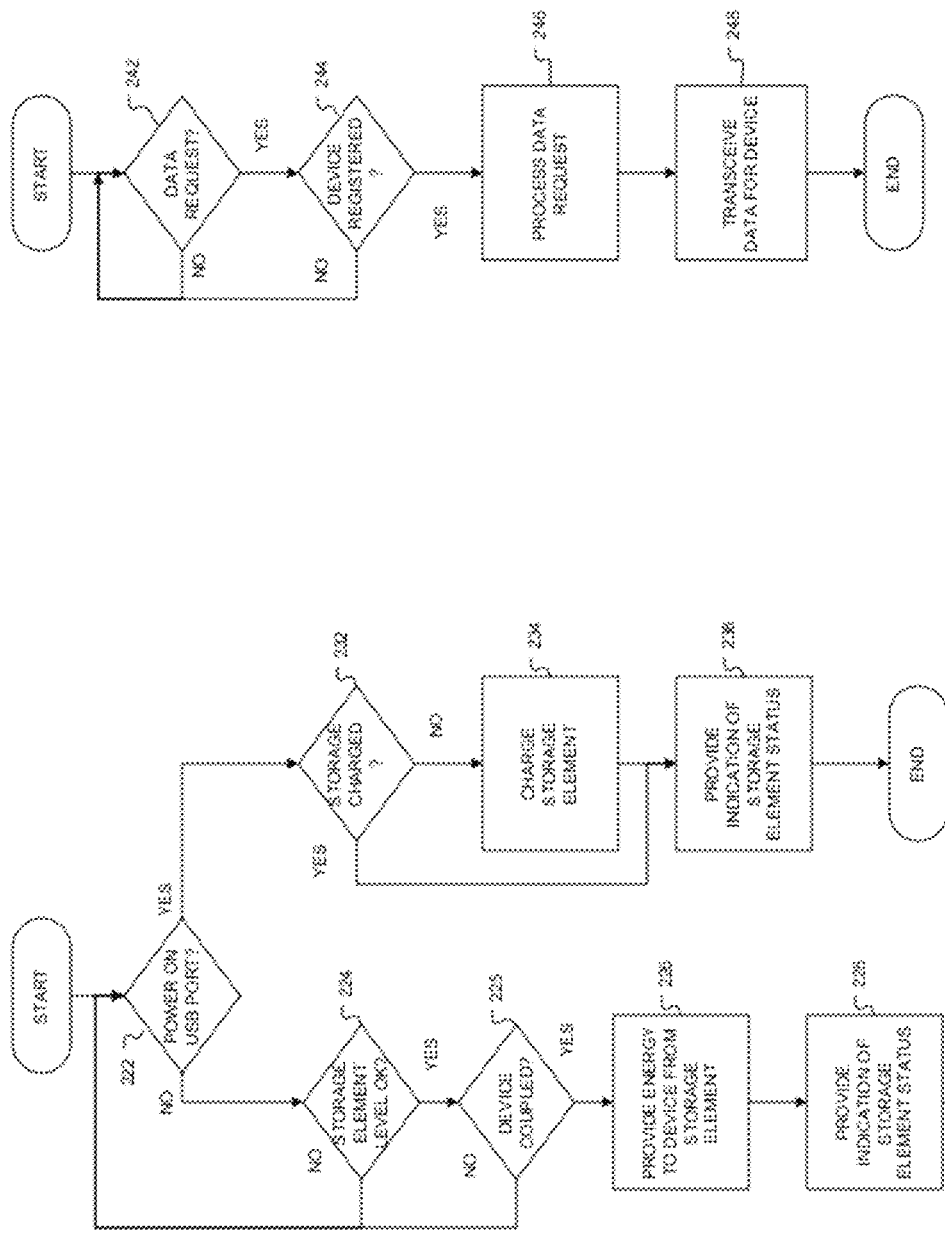

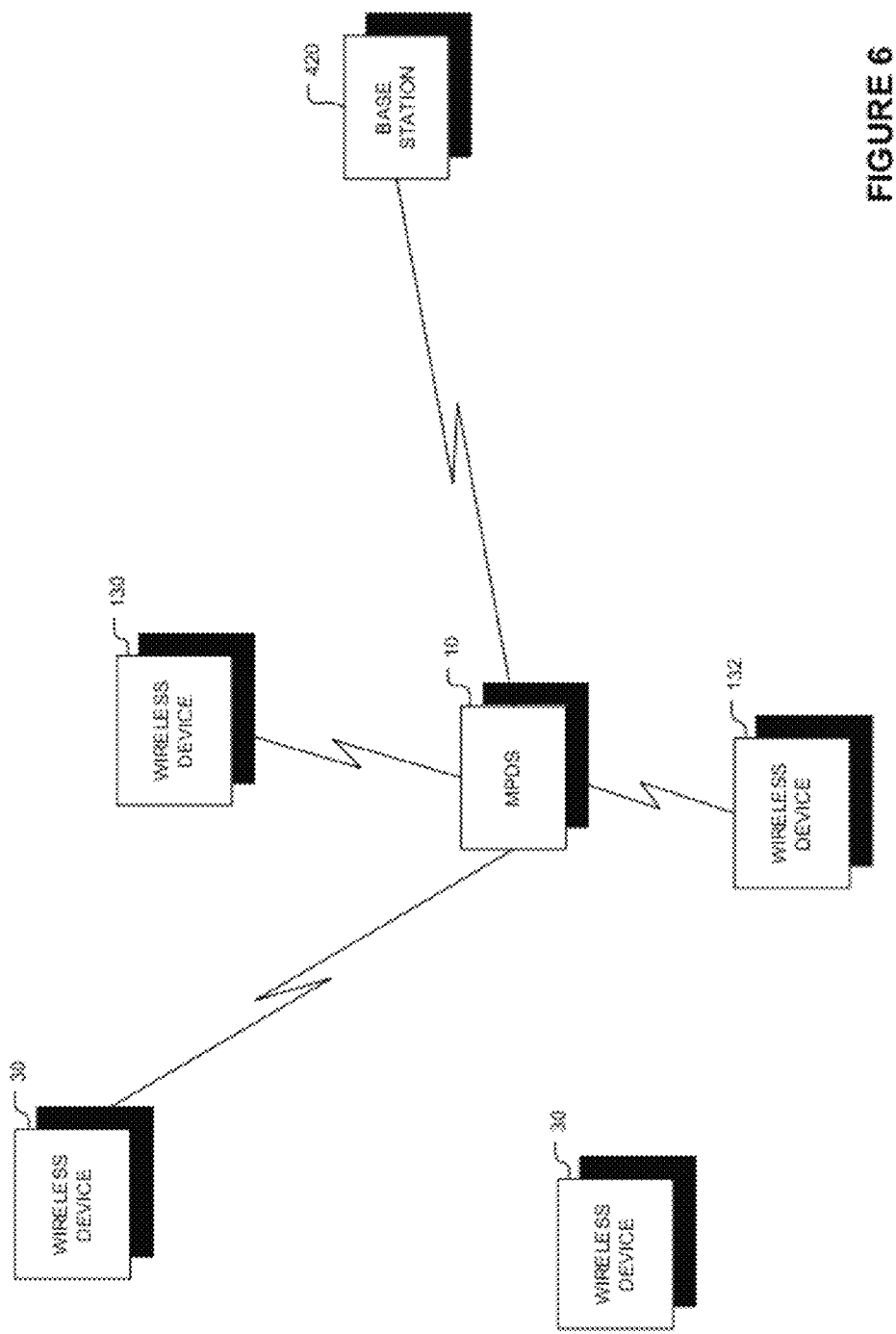

APPARATUS AND METHODS FOR COMMUNICATING POWER AND DATA WITH ELECTRONIC DEVICES

CROSS-REFERENCE TO RELATED APPLICATION

The present application is a continuation in part of application Ser. No. 13/024,310, entitled "APPARATUS AND METHODS FOR COMMUNICATING POWER AND DATA WITH ELECTRONIC DEVISES, and filed on Feb. 9, 2011, which claims priority to application Ser. No. 61/303,354, entitled "APPARATUS AND METHODS FOR SUPPLYING POWER AND DATA TO ELECTRONIC DEVICES", and filed on Feb. 11, 2010 and application Ser. No. 61/375,847, entitled "APPARATUS AND METHODS FOR COMMUNICATING POWER AND DATA WITH ELECTRONIC DEVICES", and filed on Aug. 22, 2010; the present application claims priority to application Ser. No. 61/450,122, entitled "APPARATUS AND METHODS FOR COMMUNICATING POWER AND DATA WITH ELECTRONIC DEVICES", and filed on Mar. 7, 2011, each application is considered as being part of the disclosure of the accompanying application and is hereby incorporated herein by reference.

TECHNICAL FIELD

Various embodiments described herein relate to apparatus and methods for providing electrical power and data to electronic devices.

BACKGROUND INFORMATION

It may be desirable to provide off grid power or data to an electronic device having a self-contained storage element using a multiple function secondary power, memory, backup, and data transceiving device. The present invention is such a device.

BRIEF DESCRIPTION OF THE DRAWINGS

FIG. 3C is a block diagram of an architecture including another electronic device memory, data, and power supply apparatus coupled to a powered device specific interface device according to various embodiments.

FIGS. 4A to 4D are flow diagrams illustrating several methods according to various embodiments.

FIG. 6 is a block diagram of a communication architecture comprising electronic devices, an EDPP, and base station according to various embodiments.

DETAILED DESCRIPTION

Figure 1A:
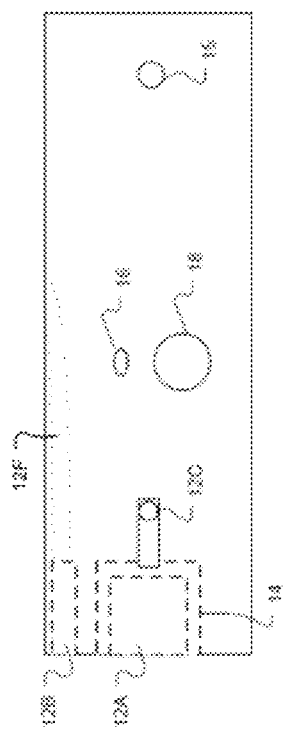
FIG. 1A is a simplified top view diagram of an electronic device memory, data, and power supply apparatus according to various embodiments with a mechanical device interface member refracted.
Figure 1B:
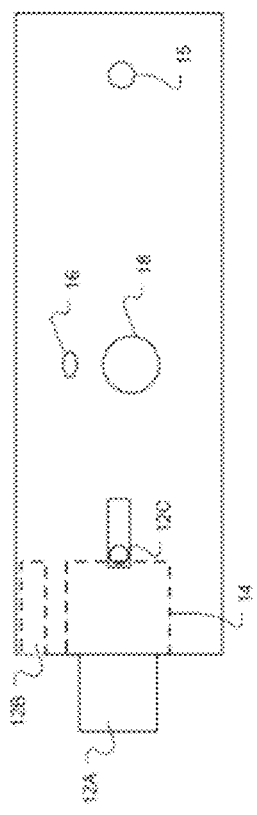
FIG. 1B is a simplified top view diagram of an electronic device memory, data, and power supply apparatus according to various embodiments with a mechanical device interface member deployed.
Figure 1C:
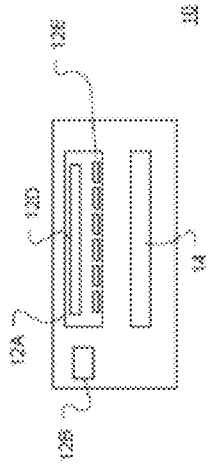
FIG. 1C is a simplified side view diagram of an electronic device memory, data, and power supply apparatus according to various embodiments with a mechanical device interface member refracted.
Figure 5A:
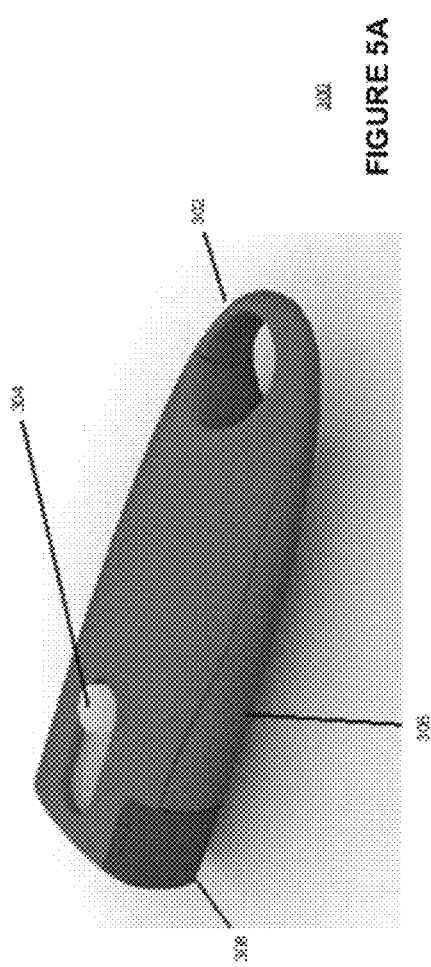
FIG. 5A is a top view of an electronic device memory, data, and power supply apparatus according to various embodiments with a device interface member retracted.
Figure 5B:
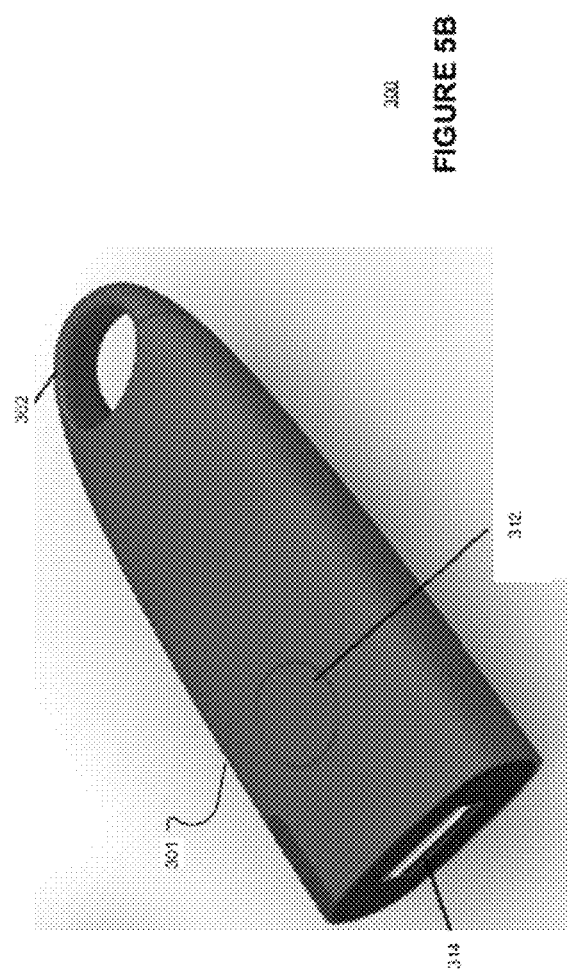
FIG. 5B is a bottom view of an electronic device memory, data, and power supply apparatus according to various embodiments with a device interface member retracted.
Figure 5D:
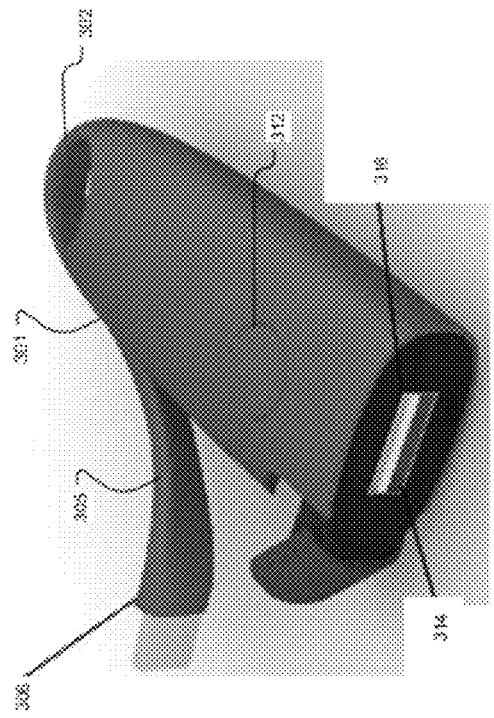
FIG. 5D is a bottom view of an electronic device memory, data, and power supply apparatus according to various embodiments with a device interface member deployed.

FIG. 1A is a simplified top view diagram of an electronic device memory, data, and power supply apparatus 10 according to various embodiments with a device interface member (DIM) 12A retracted (316 of apparatus 300 in FIG. 5D). FIG. 1B is a simplified top view diagram of an electronic device memory, data, and power supply apparatus 10 according to various embodiments with a device interface member deployed 12A. FIG. 1C is a simplified side view diagram of an electronic device memory, data, and power supply apparatus 10 according to various embodiments with a device interface member 12A retracted. The memory, power, and data supply (MPDS) apparatus 10 includes a retractable device interface member 12A, a second deployable device interface member 12B including a deformable cable 12F (306 with deformable cable 305 of apparatus 300 of FIG. 5D), a retraction control slide 12C, a memory storage interface (MSI) 14, at least one user detectable element 16, a multiple contact button 18, and a connectable hole 15 or carabineer 302 (as shown in FIGS. 5A-D). The retractable device interface member (DIM) 12A, 316 may be a universal serial bus (USB) type male interface. The USB DIM 12A, 316 may include an orientation tab 12D and several electrical contacts 12E.

In an embodiment, the first and last USB DIM 12A, 316 electrical contacts 12E may be used to communicate electrical energy (receive from or provide to a device 130). The remaining, four electrical contacts may be used to communicate data. In an embodiment, the second, deployable DIM 12B, (306, FIG. 5D) may be a mini-USB, micro-USB male interface or other interface type. In an embodiment the interface member 12A, 316 and interface member 12B, 306 may support USB and device specific interfaces including propriety device specific interfaces such as the Apple® 30-pin interface. The interface member 12B, 306 may communicate data with a coupled device (such as 130 of FIG.

2A). The interface member 12B, 306 may also receive electrical energy from a coupled device 130 (to charge an internal storage element 56 of apparatus 10, 300 (FIG. 2A)) or provide electrical energy to a coupled device 130 via the electrical energy storage element 56 of apparatus 10, 300.

The user detectable element 16 may emit light, sound, vibration, or a combination thereof. In an embodiment, the element 16 may include at least one light emitting diode (LED). The multiple contact button 18 may enable selection of one or more functions of the MPDS apparatus 10 (such as functions as described with reference to FIGS. 4A to 4D). In an embodiment the element 16 and contact button 18 (such as contact 312 of FIG. 5D) may be a combined mechanism that generates a user detectable signal and enables a user to select one or more functions for the apparatus 10. The MSI 14 may interface with one or more memory storage elements including a compact flash card, secure digital (SD), miniSD, microSD, SD high capacity (SDHC), miniSDHC, microSDHC, SD extended capacity, and memory stick. The MSI 14 may conform to the SD input-output (SDIO) standard to enable memory card and other devices to communicate with and through the MPDS apparatus 10 via the DIM 12A, 316, 12B, 306 or wirelessly (via modem 67A shown in FIG. 2A). The other devices may include a Bluetooth interface and broadband data interface.

Figure 2A:
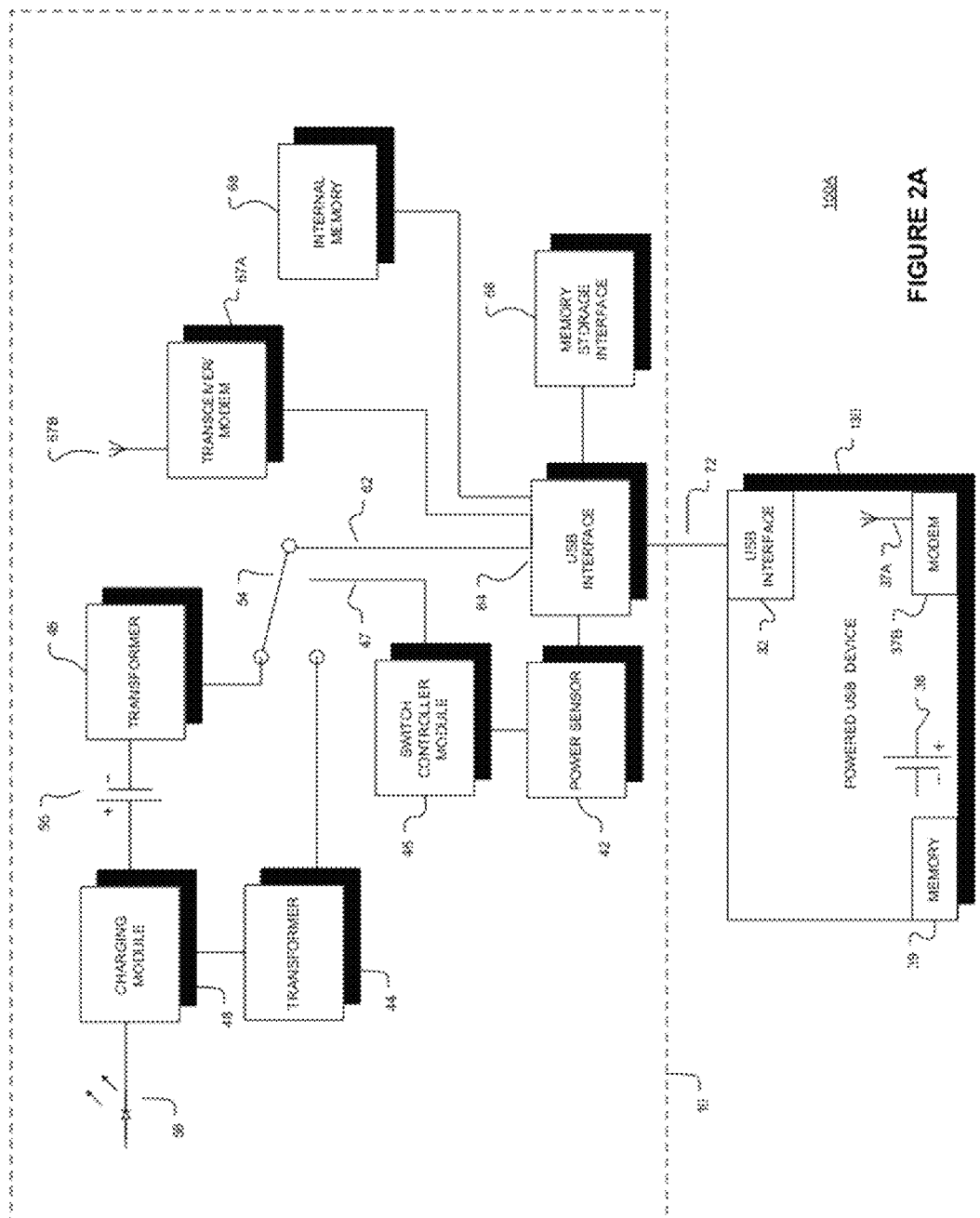
FIG. 2A is a block diagram of an architecture including an electronic device memory, data, and power supply apparatus coupled to a USB chargeable DC powered device according to various embodiments.
Figure 3A:
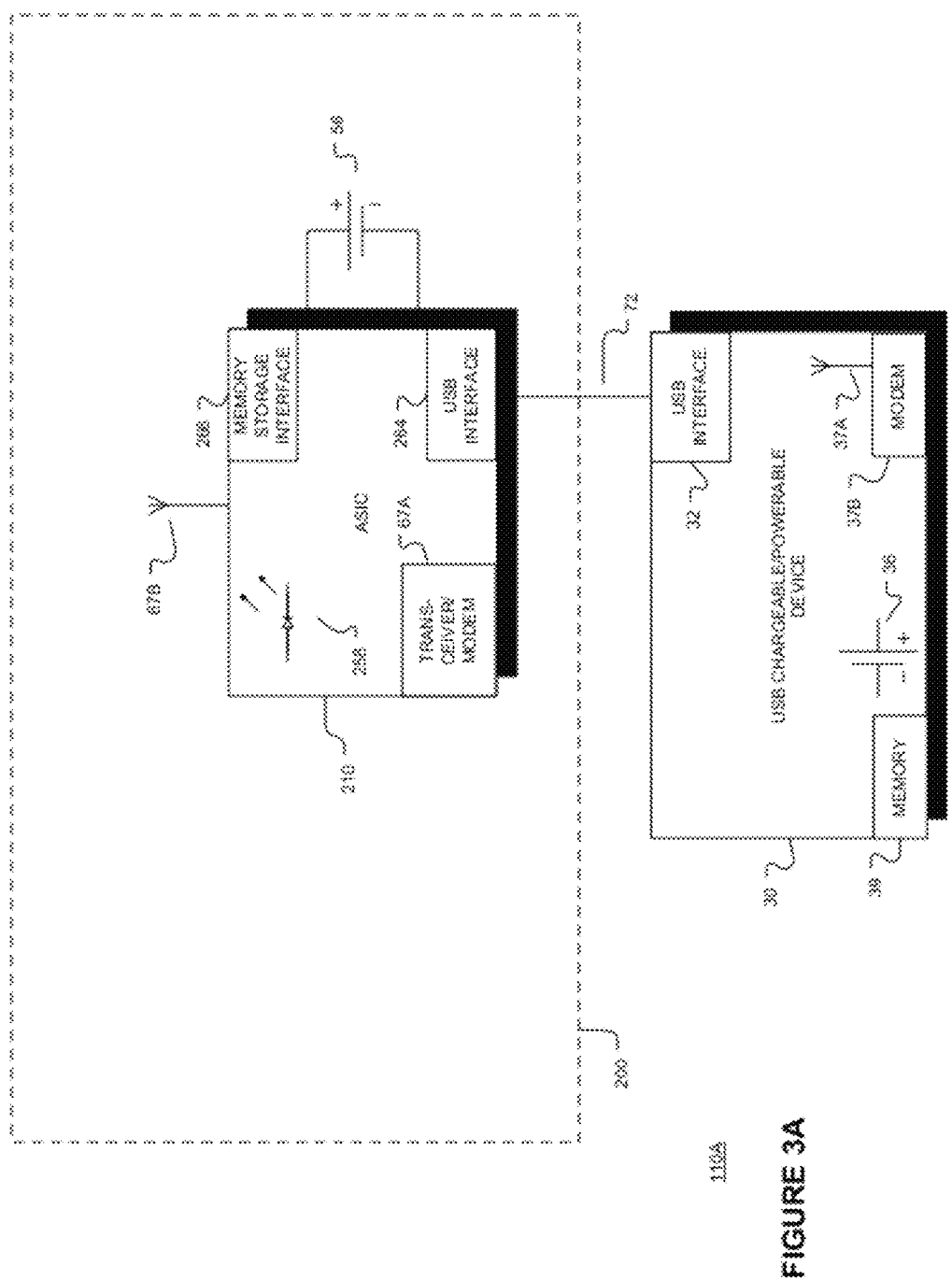
FIG. 3A is a block diagram of an architecture including another electronic device memory, data, and power supply apparatus coupled to a USB chargeable device according to various embodiments.

FIG. 2A is a block diagram of an EDPS architecture 100A including an electronic device MPDS apparatus 10 coupled to a chargeable or powerable device 130 via an interface 32 (USB or other) according to various embodiments. It is noted that any wired interface 32, 64 may be employed in addition to a USB interface, including a device specific interface such as shown in FIG. 3C. The connection 72 may represent the deployable connector 12A, 316 and second deployable connector 12B, 306. The architecture 100A includes a first MPDS device 10 and an interface for a chargeable or powerable device (USB chargeable or powerable device in an embodiment) 130. The electronic device 130, 30 may be powered and charged by a USB interface 64, 264 (FIG. 2A, 3A) (deployable connector 12A, 316 and second deployable connector 12B, 306). The electronic device 130 may be coupled to a MPDS apparatus 10, 200 via a cable 72 coupling the electronic device 130, 30 interface 32 to a MPDS apparatus 10, 200 interface 64, 264. The cabling 72 may be coupled to the deployable connector 12A, 316 and second deployable connector 12B, 306 in an embodiment. The cable 72 may also represent the deployable cable 12F, 305 of interface 12B, 306, respectively. The MPDS apparatus 10, 200 may provide electrical energy to one or more devices 130, 30 via the interface 32. The MPDS apparatus may also receive energy from one or more devices 130, 30 via the interface 32.

In an embodiment, the powerable or chargeable device 130, 30 may include a rechargeable electrical storage element 36. The MPDS apparatus 10, 200 may provide electrical energy to one or more devices 130, 30 via the interface 32 that is sufficient to a) power the devices 130, 30, b) charge an electrical storage element 36 of the device 130, 30, and c) simultaneously power a device 130, 30 and charge an electrical storage element 36 of the device 130, 30. The electrical storage element 36 may be a re-chargeable battery (including chemical and non-chemical such as NiCad, lithium-ion), capacitor, or other device capable of temporarily storing electrical energy.

In an embodiment, the MPDS apparatus 10, 200 may provide a direct current (DC) or alternating current (AC) electrical signal to a device 130, 30 via the interface 32. The electrical signal may have sufficient energy (power, voltage, and current) to power the device 130, 30 and charge the electrical storage element 36 where the energy or power requirements of the devices 130, 30 may vary. The MPDS apparatus 10, 200 may auto-detect the energy or power requirements of a device 130, 30 coupled to the MPDS apparatus 10, 200 via the interface 64, 264 and vary the electrical signal provided on wires 72 accordingly.

In an embodiment, the MPDS 10, 200 may also communicate data to the device 130, 30 via the interface 64 or wirelessly via a transceiver/modem 67A coupled to the antenna 67B. The data may be stored in one or more internal data storage elements (68) of the MPDS apparatus 10, 200 or transferred from another device coupled to a memory storage or device interface 66. As noted the memory storage interface 66 may enable communication with various memory storage elements and other devices that communicate with one or more known communication protocols including SDIO. A device 130, 30 may be able to communicate data to a device or memory coupled to the memory storage interface 66, 266 via the MPDS apparatus 10, 200 or the transceiver/modem 67A (via antenna 37A and transceiver/modem 37B).

In an embodiment, the device 130, 30, 132 (FIG. 3C) may store data in an internal data storage element or memory storage interface 39. A MPDS 10, 200, 202 may passively or automatically backup all data, specific data, changed data, or specific changed data of a device 130, 30, 132 to one or both of the internal data storage elements (68) and the memory storage or device interface 66. A user may be able to configure a MPDS 10, 200, 202 via a USB interface 64, 264, device specific interface 274, or ASIC 210, 212 to passively backup data located on a device 130, 30, 132. The MPDS 10, 200, 202 may detect the data or changes to the data and backup all data or changes of data as a function of the elected backup configuration. A user may select different backup modes including full (all data) and incremental backup (only data that has changed since the last backup). A user may also select the type of data to be copied (backed up)—such as selecting one or more of personal contacts, music, video, pictures, word documents, spreadsheets, or other specific data types.

A user may also be able to configure a MPDS 10, 200, 202 to restore backed up to a specific device 130, 30, 132. The user may also be to access the backup data to effectively transfer to a different device 130, 30, 132 or any other computer device (including a laptop, desktop, netbook, for example). In the MPDS 200, 202, the ASIC 210, 212 may include internal memory and also include a memory storage interface 266 where device 130, 30, 132 data to be protected (backed up) may be stored and then restored to the device 130, 30, 132, another device 130, 30, 132, or other computing device with a data storage device. The MPDS 10, 200, 202 may also communicate backed up data wirelessly via a modem 67A to another computing device. A user may specific the delivery or destination of backed up data during a restore. In another embodiment, a MPDS 10, 200, 202 may copy data from a device 130, 30, 132 and wirelessly communicate the data to another device for storage including a networked device or Internet coupled device. A user may be able to restore data from the network device to the device 130, 30, 132 without the MPDS 10, 200, 202 or via the MPDS 10, 200, 202 in an embodiment.

As explained with reference to FIG. 2B and FIG. 3B, 3C, the MPDS apparatus 10, 200, 202 may also be able to receive an electrical signal via the interface 64, 264, 274 from a powered interface device 30, 130 (FIG. 2B, 3B), 132 (FIG. 3C) that is sufficient to power the MPDS apparatus or charge an electrical storage element 56 of the MPDS apparatus 10, 200, 202 including via the interfaces 12A, 12B (FIG. 1A) and 316, 306 (FIG. 5D). The MPDS 10, 200 may also communicate data with the device 130, 132 via the interface 32, 33 or transceiver/modem 67A where the data may be stored in one or more internal data storage elements (68) of the MPDS apparatus 10, 200 or transferred from another device coupled to the memory storage or device interface 66, 266. Accordingly, a device 130, 132 may be able to communicate data to a device or memory coupled to the memory storage interface 66, 266 via the MPDS apparatus 10, 200 while providing electrical energy to the MPDS apparatus 10, 200. A MPDS 10, 200, 202 may also be able to communicate with devices coupled to a network, or network or networks (Internet) where the modem 67A is able to communicate with a networked device such as a wireless router.

In another embodiment, a device 30, 130, 132 may be charged or powered by energy provided from the MPDS apparatus 10, 200, 202 as a function of the MPDS apparatus 10, 200, 202 energy capacity and its own capacity or link to another power source such another USB device or on-grid power supply. Such device 30, 130, 132 may subsequently provide energy to the MPDS apparatus 10, 200, 202 sufficient to power the MPDS apparatus 10, 200, 202 and charge one or more storage elements of the MPDS 10, 200, 202. For example, the device 30, 130, 132 may be a portable computing device that includes an internal electrical energy storage element 36 and on-grid power coupling interface 35 where the power interface 35 may include a transformer or inverter. When the device 30, 130, 132 is coupled to an on-grid power source (AC or DC) 20 such as shown in FIG. 2B or its internal storage element 36 has sufficient energy, the device 30, 130, 132 may provide power on its interface 32. In an embodiment, the power source 20A may be an AC power source. The power source 20A may be part of an electrical distribution network, independent electrical source, or localized electrical source including a battery 36, generator, or solar generation module.

The MPDS apparatus 10, 200, 202 may detect when power is provided on the USB interface 64, 264, 274 via cable 72, 73. The MPDS apparatus 10, 200, 202 may then use this power to operate or charge one or more storage elements 56. The device 30, 130, 132 may lose its on-grid power source 20 (become decoupled or power loss), or its internal storage element 56 may become depleted to a preset level where the device 30, 130, 132 does not provide power on the interface 32, 33. In such an embodiment or state, the MPDS apparatus may detect the lack of an electrical signal with a sufficient voltage or current level on the interface 64, 264, 274.

The MPDS apparatus 30, 200, 202 as a function of its own internal storage elements 56 levels (voltage or current) may provide electrical energy on the interface 64, 74 to the device 30, 130, 132. This cycle may alternate as a function of the respective energy levels of the respective storage elements 36, 56 and the presence of an on-grid power source 20. In an embodiment, the MPDS apparatus 10 may employ a power sensor 42 to determine when the power or energy on the USB interface 64 is sufficient to power or charge the MPDS apparatus 10 and controls the switch 54 accordingly via a switch controller module 46. It is noted that the device 30, 130, 132 may be a USB charger in an embodiment where the charger is coupled to an on-grid source 20 and charges the MPDS apparatus 10, 200 storage elements 56.

When the MPDS apparatus has detected insufficient energy or power levels on the USB interface 64 via the power sensor 42, the switch controller module 46 may set the switch 54 to provide electrical energy from one or more storage elements 56 and the second transformer 45 to the USB interface until the storage elements 56 reach a minimal, preset level. The switch controller module 46 may then set the switch 54 to receive electrical energy (if any) from the USB interface 64 as shown in FIG. 2B. The switch controller module 46 may also set the switch 54 to receive electrical energy from the USB interface 64 when the power sensor 42 detects sufficient electrical energy on the USB interface 64. In another embodiment, a device 30, 130, 132 may communicate data that it is able or unable to provide sufficient electrical energy to the MPDS apparatus 10, 200, 202 and the MPDS apparatus 10 may set the switch 54 via the switch controller module 46 accordingly.

The transformer 44 may convert the energy level (voltage and current received from a device 30, 130, 132 via the interface 64 to a level sufficient to power the MPDS apparatus 10 or charge one or more internal storage elements 56 via a charging module 48. Accordingly, the MPDS apparatus may be able to be charged from a lower power USB source while providing a higher power charging signal or energy to another device 30, 130, 132. The MPDS apparatus 10, 200 may also include a user detectable device 58 where the device provides an indication of the charging or discharging state of the one or more storage elements 56. The user detectable device 58 may also indicate data transfer activity with an internal memory 68 or a device coupled to the memory storage interface 66.

In the MPDS apparatus 200 the power sensor 42, the switch controller 46, the switch 54, the charging module 48, the first transformer 44, the second transformer 45, the user detectable device, the internal memory 68, the memory storage device 66, and the USB interface 64 may be implemented in one or more application specific integrated circuits (ASIC). One or more elements may be separately coupled to the ASIC.

Figure 2B:
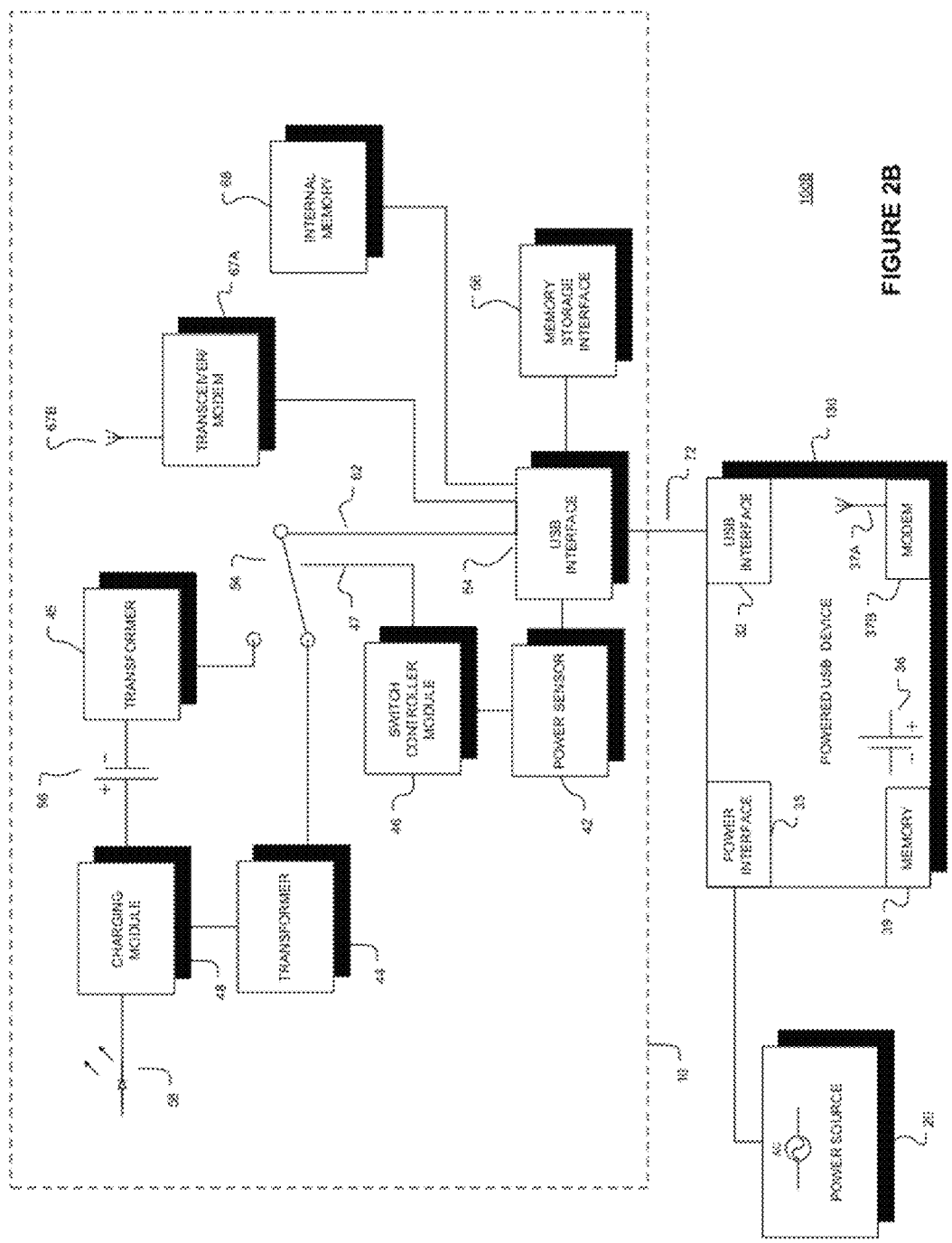
FIG. 2B is a block diagram of an architecture including an electronic device memory, data, and power supply apparatus coupled to a powered USB device according to various embodiments.
Figure 3B:
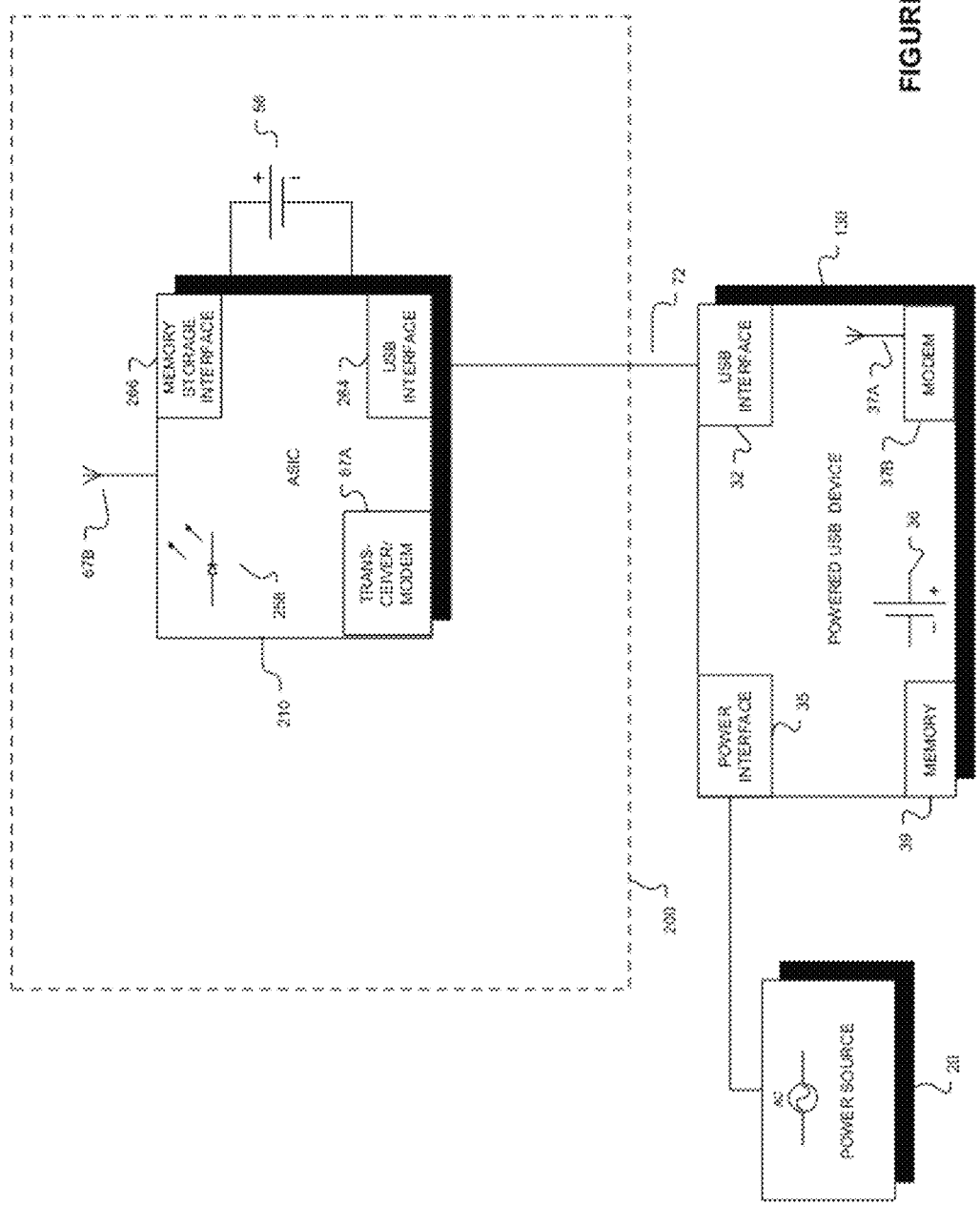
FIG. 3B is a block diagram of an architecture including another electronic device memory, data, and power supply apparatus coupled to a powered USB device according to various embodiments.

In an embodiment the MPDS 10 of FIGS. 2A, 2B may further include a transceiver/modem module (TMM) 67A and an antenna 67B. The TMM 67A may be any device capable of communicating data in one or more data communication formats including wireless and wired formats. Referring to FIG. 6, the TMM 67A may be included in an MPDS 10, 200, 202, 300. The MPDS 10, 200, 202, 300 may be part of a wireless architecture 400 that may include one or more wireless or wired devices 30, 130, 132 and a wireless data or voice provider base station 420. The TMM 67A may include a transceiver and modem that may communicate digital data or voice signals with one or more electronic devices (30, 130, 132A) and the digital data and voice signal base station or router 420.

The base station 420 may be part of a larger network that may communicate with other base stations, electronics devices 30, 130, 132A, MPDS 10, 200, 202, computers, and networks of networks (commonly termed the "Internet"). In an embodiment, the base station 420 may communicate data with the MPDS 10 TMM 67A using one or more known digital communication formats including a cellular protocol such as code division multiple access (CDMA), time division multiple access (TDMA), Global System for Mobile Communications (GSM), cellular digital packet data (CDPD), Worldwide Interoperability for Microwave Access (WiMAX), satellite format (COMSAT) format, and local protocol such as wireless local area network (commonly called "WiFi") and Bluetooth.

In an embodiment, the TMM 67A may act as an Internet Service Provider (ISP). Accordingly the TMM 67A may enable local data communication between the wireless (or wired via interface 64) devices 30, 130, 132A. The TMM 67A may also communicate data requests to remote internet protocol "IP" addresses via a URL or IP address. In an embodiment, a TMM 67A or MPDS 10, 200, 202 may employ the process 240 shown in FIG. 4B to process one or more electronic data (that may include electronic data or voice in an electronic format) requests from one or more electronic devices 30, 130, 132. As noted an electronic device 30, 130, 132 may communicate a request for data via a physical or wired connection(s) such as connectors 12A, 12B shown in FIG. 1A or via a wireless signal.

As shown in FIG. 4B, upon receipt of a data request (activity 242) from an electronic device 30, 130, 132 via a wired or wireless signal, a MPDS 10, 200, 202, 300 may first determine whether the requesting device is registered or permitted to employ the MPDS 10, 200, 202 to request data (from an external source via the TMM 67A or locally via an memory device 66 or 68 as shown in FIG. 2A). A MPDS 10, 200, 202 may require a requesting device 30, 130, 132 to register using a known protocol or provide a security key. A MPDS 10, 200, 202 may send webpages to a requesting device 30, 130, 132 where the webpage includes a registration or security questions. The registration or security webpage may enable an electronic device 30, 130, 132 to be registered with the MPDS 10, 200, 202. Such registration may be time or data usage limited as a function of the device 30, 130, 132 registration or security information.

The webpage may also include options for data backup functions including options and restoring data from a backup. The webpage may allow a user to select the type of data and type of backup to be performed for the data. The webpage may also allow a user to designate multiple backup destinations including networked (via the modem 67A) locations or devices. The data types may include device 30, 130, 132 such as operating system data, multimedia data (including music, video, and pictures), and business or personal data (such as contracts, calendars, word, spreadsheet, and presentation files).

A MPDS 10, 200, 202 may process the data request (activity 246) by determining whether the requested data is stored on the MPDS 10, 200, 202 or request is to a local device 30, 130, 132, or request is outside the local network. When the data requested is on the MPDS, the MPDS may send the data to the requesting device (activity 248). Otherwise, the MPDS 10, 200, 202 may then generate a corresponding data request using the appropriate protocol (such as IP) and send the data request to either a local device 30, 130, 132 or to a base station 420 as appropriate. The MPDS 10, 200, 202 may then transceive data requests and responses between the requesting device 30, 130, 132 and the responding device 30, 130, 132 or base station 420 (activity 248). As shown in FIGS. 2A to 3C, the electronic device 30, 130, 132 may include a modem 37B and an antenna 37A to transceive signals with a MPDS 10, 200, 202.

In an embodiment, the MPDS 10, 200, 202 TMM 67A may communicate digital signals with the base station 420 using a first digital communication protocol and the electronic devices 30, 130, 132A using a second, different communication protocol. For example, the MPDS 10, 200, 202 TMM 67A may communicate with the base station 420 using a cellular protocol such as code division multiple access (CDMA), time division multiple access (TDMA), Global System for Mobile Communications (GSM), Worldwide Interoperability for Microwave Access (WiMAX) or COMSAT protocol and communicate with the electronic devices 30, 130, 132 using a local protocol including WiFi and Bluetooth.

As known to one skilled on the art the Bluetooth protocol includes several versions including v1.0, v1.0B, v1.1, v1.2, v2.0+EDR, v2.1+EDR, v3.0+HS, and v4.0. The Bluetooth protocol is an efficient packet-based protocol that may employ frequency-hopping spread spectrum radio communication signals with up to 79 bands, each band 1 MHz in width, the respective 79 bands operating in the frequency range 2402-2480 MHz. Non-EDR (extended data rate) Bluetooth protocols may employ a Gaussian frequency-shift keying (GFSK) modulation. EDR Bluetooth may employ a differential quadrature phase-shift keying (DQPSK) modulation.

The WiFi protocol may conform to a Institute of Electrical and Electronics Engineers (IEEE) 802.11 protocol. The IEEE 802.11 protocols may employ a single-carrier direct-sequence spread spectrum radio technology and a multi-carrier orthogonal frequency-division multiplexing (OFDM) protocol. In an embodiment, one or more electronic devices 30, 130, 132 may communicate with the MPDS 10 TMM 67A via a WiFi protocol.

The cellular formats CDMA, TDMA, GSM, CDPD, and WiMax are well known to one skilled in the art. It is noted that the WiMax protocol may be used for local communication between the one or more electronic devices 30, 130, 132 may communicate with the MPDS 10 TMM 67A. The WiMax protocol is part of an evolving family of standards being developed by the Institute of Electrical and Electronic Engineers (IEEE) to define parameters of a point-to-multipoint wireless, packet-switched communications systems. In particular, the 802.16 family of standards (e.g., the IEEE std. 802.16-2004 (published Sep. 18, 2004)) may provide for fixed, portable, and/or mobile broadband wireless access networks. Additional information regarding the IEEE 802.16 standard may be found in IEEE Standard for Local and Metropolitan Area Networks—Part 16: Air Interface for Fixed Broadband Wireless Access Systems (published Oct. 1, 2004). See also IEEE 802.16E-2005, IEEE Standard for Local and Metropolitan Area Networks—Part 16: Air Interface for Fixed and Mobile Broadband Wireless Access Systems—Amendment for Physical and Medium Access Control Layers for Combined Fixed and Mobile Operation in Licensed Bands (published Feb. 28, 2006). Further, the Worldwide Interoperability for Microwave Access (WiMAX) Forum facilitates the deployment of broadband wireless networks based on the IEEE 802.16 standards. For convenience, the terms "802.16" and "WiMAX" may be used interchangeably throughout this disclosure to refer to the IEEE 802.16 suite of air interface standards.

As noted, one or more electronic devices 30, 130, 132 may be coupled the MPDS 10, 200, 202 via a physical connection such as via 12A, 12B shown in FIG. 1A and 316, 306 shown in FIGS. 5A-5E. The TMM 67A may employ one or more wired digital data communication protocols to communicate with an electronic device 30, 130, 132 in such an embodiment including the Ethernet protocol or Internet protocol (IP), IEEE 802.3. Using wired or wireless communication, a MPDS 10, 200, 202 may enable an electronic device 30, 130, 132 to communicate digital with the Internet and corresponding act as a "mobile hotspot", mobile broadband device, and ISP. In an embodiment the antenna 67B may be circular antenna with multiple, selectable connections to elect the wavelength/frequency of signals to be communicated with an electronic device 30, 130, 132 and base station 420.

As noted above FIGS. 3A and 3B are block diagrams of a MPDS apparatus 200 that employs an ASIC 210 according to various embodiments. The MPDS apparatus 200 may include an Application Specific Integrated Circuit (ASIC) 210, an antenna 67B and an electrical storage element 56. The ASIC 210 may include a TMM 67A, memory storage interface 266, USB interface 264, and one or more user detectable signal generation modules 258 as part of or coupled to the ASIC 210. The ASIC 210 may perform the functions of transformers 44, 45, a switch controller module 46, a charging module 48, a USB interface 64, a memory storage interface 266, an internal memory 268, a TMM 67A, and a multiple position switch 54. In an embodiment, the MPDS apparatus 200 USB interface 264 may be one of a male or female based electrical contact interface and the device 30, 130 USB interface 32 may be one of a female or male USB interface, respectively The interface 264 may also be device specific or other interfaces 12A, 12B, 316, 306.

In embodiment, the MPDS apparatus 200 ASIC 210 may receive an electrical signal from the USB interface 264 and the electrical storage element 56. The ASIC 210 may determine whether the electrical signal provided by the storage element is sufficient to provide power one or more device(s) 30 and may direct energy from the electrical storage element 56 to provide an electrical signal on an USB interface 264 built into the ASIC 210. An electrical cable 72 may couple the ASIC 210 USB interface 264 to the device 30 USB interface 32 where the cable 72 may represent the cable 12F, 305 of interface 12B, 306, respectively. The interface 264 may include the interface 12A, 12B, 316, or 306 to couple to the device 30 interface 32. The ASIC 210 may also control the charging of the electrical storage element 56 when sufficient electrical energy is provided on the USB interface 264 (FIG. 3B).

The ASIC 210 may further transform the electrical energy provided by the USB interface 264 to the DC voltage/amperage rating needed to charge the electrical storage element 56. The ASIC 210 via one or more user detectable signal generation modules 258 (16 or 18 of FIG. 1A and 312 of FIG. 5D) may inform a user when the electrical storage element 56 is being charged, discharged, external power is present, and when one or more DC powered devices 30, 130, 132 are electrically coupled to the MPDS apparatus 200. The one or more user detectable signal generation modules 258 (16 or 18 of FIG. 1A and 312 of FIG. 5D) may also indicate data communication between the MPDS 10, 200, 202 and an electronic device 30, 130, 132 or base station 420. In an embodiment, a user detectable signal generation module 58, 258, (16 or 18 of FIG. 1A and 312 of FIG. 5D) may include one or more light emitting diodes (LEDs), other light generation devices, vibration modules, or audible generation devices (speakers).

FIG. 3C is a block diagram of another MPDS apparatus architecture 100C according to various embodiments. The DC powered device 132 in the architecture 100C may have a device specific interface 33. The MPDS apparatus 202 may include an ASIC 212 that has a corresponding device specific interface 274, an antenna 67B, and an electrical storage element 56. The ASIC 212 may include a TMM 67A, a memory storage interface 266, the device specific interface 274, and one or more user detectable signal generation modules 258 as part of or coupled to the ASIC 212. The ASIC 212 may receive from or provide electrical energy to the device 132 via the device specific interface 274 coupled via wires 73 to the device 132 device specific interface 33 where the wires 73 may represent the deformable wires or cables 12F, 305 of interface 12B, 306. The device specific interface 274 may also be deployable such as interface 12A, 316 of FIGS. 1A and 5C, respectively.

FIG. 4A is a flow diagram illustrating several methods 220 according to various embodiments. A MPDS 10, 200, 202 may employ the method 220 illustrated by the FIG. 4A flow diagram. The method 220 may determine whether sufficient power is being provided by a device on the USB interface 12A, 12B, 64, 264, 316, 306 or device specific interface 274 to power the MPDS apparatus 10, 200, 202 (activity 222). When a. the power is insufficient (activity 222); b. the storage element level is sufficient (activity 224); and c. at least one device 30, 130, 132 is coupled to the MPDS activity 10, 200, 202, (activity 225), the method 220 may provide energy to the one or more devices 30, 130, 132 from an electrical storage element 56 (activity 226) and provide an indication of the electrical storage element status 56 via the user detectable signal generation device 58, 258, 16, 18, 312 (activity 228). In an embodiment, the method 220 may also require a user to depress a button 16, 312 in one or more directions in addition to the conditions of activities 224, 225 prior to providing electrical energy from a storage element 56 to a coupled device 30, 130, 132.

When sufficient power is detected on the USB interface 64, 264, or device specific interface 274 (activity 222) and the electrical storage device 56 is not fully charged (activity 232) the method 220 may charge the electrical storage element 56 (activity 234) and provide an indication of the electrical storage element 56 charge level via the user detectable signal generation device 58, 258, 16, 18, 312 (activity 236). In an embodiment the method 220 may also power the MPDS apparatus 10, 200, 202 to communicate data between the apparatus 10, 200, 202 and a coupled device 30, 130, 132, TMM 67A, and internal memory 66 and a memory storage interface 68.

Figure 4D:
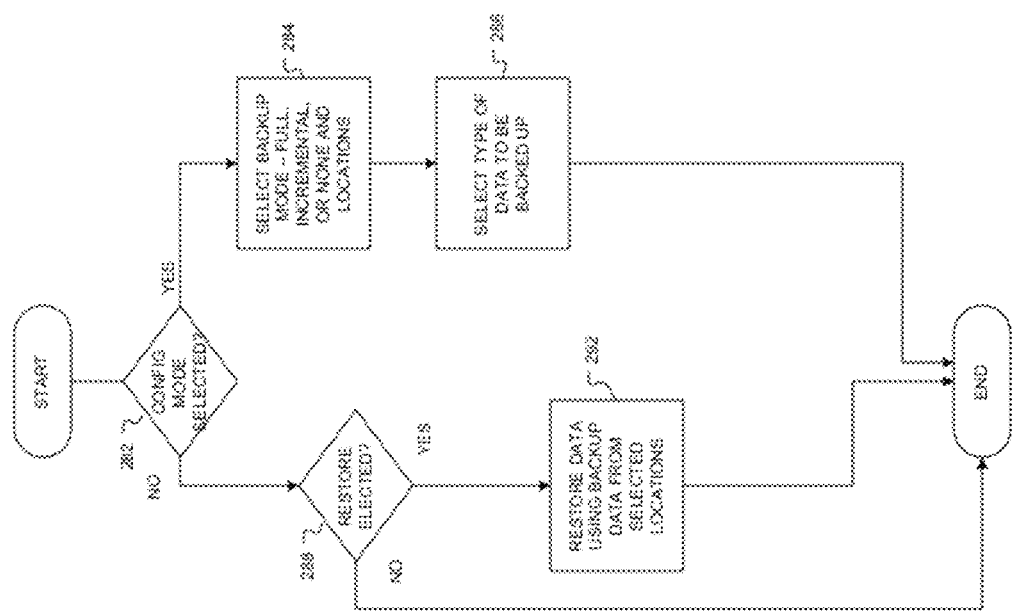
Figure 4C:
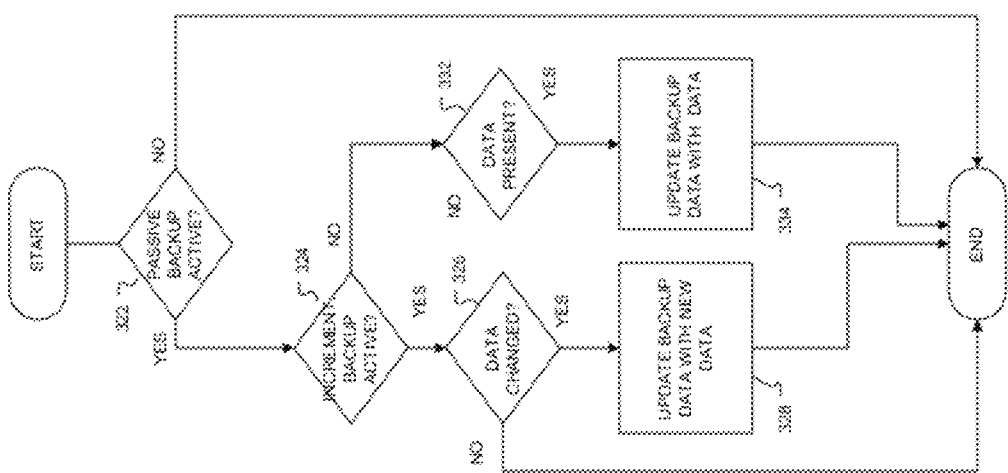

FIG. 4C is a flow diagram illustrating several methods 320 according to various embodiments when a MPDS 10, 200, 202, 300 is coupled to a device 30, 130, 132 via an interface 12A, 12B, 72, 73, 306, 316 or wirelessly. A MPDS 10, 200, 202, 300 may employ the method 260 illustrated by the FIG. 4C flow diagram to backup data stored on a device 130, 30, 132 (such in the device 130, 30, 132 memory 39). In the backup method 320, when passive backup is active (been configured by a user to be active such as by a webpage from the MDPS 10, 200, 202) (activity 322), the method 320 may first determine the type of backup to be performed (activity 324). A user may elect to backup all data of selected types or only the selected data that has changed since the last backup (incremental backup). When the selected data types such as operating system data, multimedia data (including music, video, and pictures), and business or personal data (such as contracts, calendars, word, spreadsheet, and presentation files) includes changed data and incremental is selected, the method 320 may update backup data with the new or changed data (activity 324, 326, 328).

As noted the backup data may be stored locally on a MPDS 10, 200, 202 or on a networked device where the data is communicated from a device 130, 30, 132 to the networked device via a MPDS 10, 200, 202 modem 67A. Similarly when a full backup has been configured, the selected data may be backed up locally on a MPDS 10, 200, 202 or on a networked device where the data is communicated from a device 130, 30, 132 to the networked device via a MPDS 10, 200, 202 modem 67A (activity 332, 334).

FIG. 4D is a flow diagram illustrating several methods 280 according to various embodiments. A MPDS 10, 200, 202, 330 may employ the method 280 illustrated by the FIG. 4D flow diagram to enable a user to configure the backup options for data stored on a device 130, 30, 132 (such in the device 130, 30, 132 memory 39) or restore data previously backed up. The method 280 may enable a user to configure one or more backup options for the device 10, 200, 202, 300 (activity 282). As noted a webpage may enable a user to configure various data backup options or to restore data from one or more backups (activity 288). The webpage may enable a user to select the type of data and type of backup to be performed for the data (activity 284, 286). The webpage may also enable a user to designate multiple backup destinations including networked (via the modem 67A) locations or devices (activity 284). The method 280 or webpage may also enable a user to select the device 30, 130, 132 data types to be protected or backed up including data types such as operating system data, multimedia data (including music, video, and pictures), and business or personal data (such as contracts, calendars, word, spreadsheet, and presentation files) (activity 286).

The method 280 may also enable a user to restore data from one or more backups to a device 130, 30, 132 or other computer device (activity 292). The method 280 may enable data from several locations including local to a MPDS 10, 200, 202, 300 or networked to be used to restore data to a device 130, 30, 132, other coupled device, or to a networked device (activity 292).

Figure 5E:
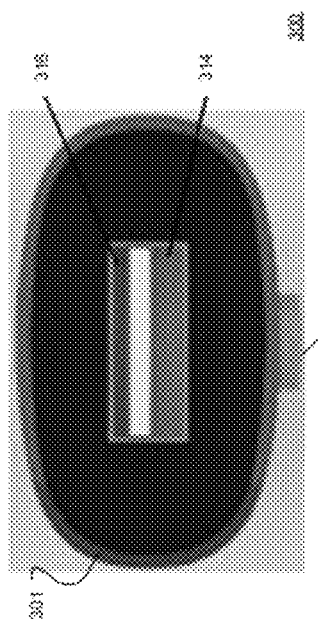
FIG. 5E is a side view of an electronic device memory, data, and power supply apparatus according to various embodiments.
Figure 5C:
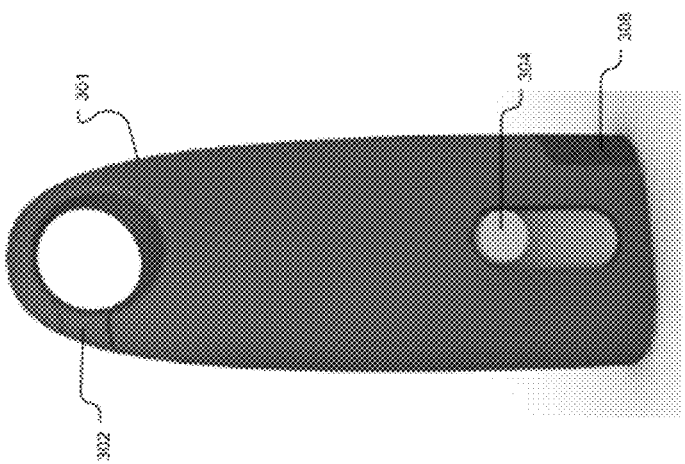
FIG. 5C is another top view of an electronic device memory, data, and power supply apparatus according to various embodiments with a device interface member retracted.

FIG. 5A is a top view of a MPDS apparatus 300 according to various embodiments with a device interface member 316 retracted. FIG. 5B is a bottom view of an MPDS apparatus 300 according to various embodiments. FIG. 5C is another top view of a MPDS apparatus 300 according to various embodiments. FIG. 5D is a bottom view of an MPDS apparatus 300 according to various embodiments with a device interface member 306 deployed. FIG. 5E is a side view of a MPDS apparatus 300 according to various embodiments. The MPDS apparatus 300 includes retraction slide 304, mini-USB or micro-USB interface 306 in deployment mechanism 308, a memory storage interface 314, a retractable male USB interface 316, an operation button 312 with LED, and a carabineer 302 all encased in a housing 301. The button 312 may protrude from a section of the housing 301. The retractable male interface 316 may also protrude from a section of the housing 301. The mini-USB or micro-USB interface 306 may include a section adjacent the housing 301. The mini-USB or micro-USB 306 and male USB 316 may be coupled to a USB interface 64, 264. The button 312 may have several contacts or positions that enable a user to charge and discharge an internal storage element 56 and couple and uncouple devices in the memory storage interface 314.

The mini-USB or micro-USB 306 may include a deformable cable 305 and locking mechanism 308. The locking mechanism 308 may be a flexible material including one or more tabs that engage the apparatus 300 housing 301 to hold the interface 306 in a stored position when not deployed. The user control-user perceptible device/button 312 may also enable a user to select or engage backup of data on a device 30, 130, 132 coupled to the apparatus 300. In an embodiment a MPDS apparatus 10, 200, 202, 300 may be about 2 to 4 inches in length, 0.5 to 2 inches in width, about 0.2 to 1 inch in height.

Any of the components previously described can be implemented in a number of ways, including embodiments in software. Any of the components previously described can be implemented in a number of ways, including embodiments in software. Thus, the transformers 44, 45, switch controller module 46, charging module 48, USB interface 64, 264, device specific interface 274, TMM 67A, and memory storage interface 68 may all be characterized as "modules" herein.

The modules may include hardware circuitry, single or multi-processor circuits, memory circuits, software program modules and objects, firmware, and combinations thereof, as desired by the architect of the architecture 10 and as appropriate for particular implementations of various embodiments. The apparatus and systems of various embodiments may be useful in applications other than a sales architecture configuration. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within and couplable to a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion. A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus, the following claims are hereby incorporated into the Detailed Description, with each claim standing on its own as a separate embodiment.

What is claimed is:

1. A portable apparatus for directly communicating power and data with an electronic device (ED), the ED including a power and data interface (PDI) including an electrical connector including a plurality of electrical contacts, at least two electrical contacts for communicating power (ECCP) and at least two, different electrical contacts for communicating data (ECCD), including an electrical energy storage element (EESE), and memory, the apparatus including:
 a portable housing, the portable housing mechanically separate from the ED, the housing substantially encasing:
  a first power and data interface module (PDIM), disposed within the housing, the module including an electrical connector, the electrical connector including a plurality of electrical contacts including at least two (ECCP) and at least two different electrical contacts for communicating data (ECCD), the electrical connector having a mechanical shape configured to mechanically mate with an ED electrical connector and electrically couple the PDIM electrical connector at least two ECCP with an ED electric connector at least two ECCP and electrically couple the first PDIM electrical connector at least two ECCD with the ED electric connector at least two ECCD;
  an internal electrical energy storage module (IEESM), disposed within the housing, the module including an electrical energy storage element (EESE) capable of storing electrical energy received from a USB source and discharging electrical energy;
  an electrical energy and data communication module (EEDCM), disposed within the housing, operatively coupled to the IEESM and the first PDIM, the EEDCM directly communicating electrical energy between an ED and the apparatus IEESE via the first PDIM electrical connector at least two ECCP, the IEESM configured to communicate electrical energy to the ED having a greater amount of power than the electrical energy received by the EESE from the USB source, and communicating data between an ED and the apparatus via the first PDIM electrical connector at least two ECCD;
  a data storage module (DSM), disposed within the portable housing, operatively coupled to the EEDCM, the DSM storing data received from an ED via the EEDCM and first PDIM and providing stored data to an ED via the EEDCM and first PDIM; and
  a backup module, disposed within the portable housing, the backup module automatically backing up data located in the ED memory to the DSM via the EEDCM when the first PDIM is operatively coupled to the ED.

2. The portable apparatus for communicating power and data with an ED of claim 1, the housing further substantially encasing a user perceptible signal generation module, disposed within the housing, the signal generation module providing an indication of data from an ED being backed up in the apparatus DSM.

3. The portable apparatus for communicating power and data with an ED of claim 1, wherein the housing is substantially monolithic and portable.

4. The portable apparatus for communicating power and data with an ED of claim 1, wherein the DSM includes an internal data module and directly communicates data between the internal memory module and the EEDCM.

5. The portable apparatus for communicating power and data with an ED of claim 1, wherein the housing further substantially encases an external memory storage interface module (EMSIM), the EMISM including an opening to receive a removable memory module and at least one electrical connector for electrical coupling to a removable memory module electrical connector and wherein the DSM directly communicates data between the EMSIM and an ED via the EEDCM and the first PDIM electrical connector at least two ECCD including storing data received from an ED and providing stored data to an ED.

6. The portable apparatus for communicating power and data with an ED of claim 1, wherein the housing further encases a charging module coupled to the EEDCM and IEESM, the charging module charging the EESE via electrical energy received via the first PDIM and the EEDCM.

7. The portable apparatus for communicating power and data with an ED of claim 6, wherein the first PDIM includes a universal serial bus (USB) mechanical and electrical interface.

8. The portable apparatus for communicating power and data with an ED of claim 6, wherein the first PDIM includes an interface specific to the electronic device.

9. The portable apparatus for communicating power and data with an ED of claim 1, wherein the first PDIM further includes a flexible cable coupled to the electrical connector and the flexible cable and electrical connector shaped and sized to substantially seamlessly nest within a flexible cable receiving portion of the housing when not deployed and extend beyond the section of the housing when deployed.

10. The portable apparatus for communicating power and data with an ED of claim 9, wherein the housing substantially encases a second power and data interface module (PDIM), the second PDIM including an electrical connector including a plurality of electrical contacts including at least two (ECCP), the second PDIM couplable to the IEESM via the EEDCM.

11. A portable apparatus for communicating power and wirelessly communicating data with an electronic device (ED), the ED including a power and data interface (PDI) including an electrical connector including a plurality of electrical contacts, at least two electrical contacts for communicating power (ECCP) and at least two, different electrical contacts for communicating data (ECCD), including an electrical energy storage element (EESE), and a wireless signal modulator-demodulator (WSMODEM), including:

a substantially monolithic, portable body mechanically separate from the ED, the body substantially encompassing:

a first power and data interface module (PDIM), the first PDIM including an electrical connector, the electrical connector including a plurality of electrical contacts including at least two (ECCP) and at least two different electrical contacts for communicating data (ECCD), the electrical connector having a mechanical shape configured to mechanically mate with an ED electrical connector and electrically couple the first PDIM electrical connector at least two ECCP with the ED electric connector at least two ECCP and electrically couple the first PDIM electrical connector at least two ECCD with the ED electric connector at least two ECCD;

an internal electrical energy storage module (IEESM), the module including an electrical energy storage element (EESE) capable of storing electrical energy received from a USB source and discharging electrical energy;

an electrical energy and data communication module (EEDCM) operatively coupled to the IEESM and the first PDIM, the EEDCM directly communicating electrical energy between an ED and the apparatus IEESE via the first PDIM electrical connector at least two ECCP, the IEESM configured to communicate electrical energy to the ED having a greater amount of power than the electrical energy received by the EESE from the USB source, and communicating data between an ED and the apparatus via a WSMODEM and via the first PDIM electrical connector at least two ECCD; and a data storage module (DSM) operatively coupled to the EEDCM, the DSM storing data received from an ED via the EEDCM and the first PDIM and the EEDCM and the WSMODEM and providing stored data to an ED via the EEDCM and the first PDIM and the EEDCM and the WSMODEM;

wherein the WSMODEM, the WSMODEM coupled with the EEDCM and capable of communicating data with the ED, wirelessly, via wireless signals having a protocol compatible with an ED WSMODEM.

12. The portable apparatus for communicating power and data with an ED of claim 11, the substantially monolithic, portable body further substantially encompassing a user perceptible signal generation module, the signal generation module providing an indication of wireless data communication between the apparatus and an ED.

13. The portable apparatus for communicating power and data with an ED of claim 11, the substantially monolithic, portable body further substantially encompassing a second power and data interface module (PDIM), the second PDIM including an electrical connector and flexible electrical cable, the flexible electrical cable coupled to the electrical connector, the electrical connector including a plurality of electrical contacts including at least two (ECCP), the electrical connector having a mechanical shape configured to mechanically mate with an ED electrical connector and electrically couple the second PDIM electrical connector at least two ECCP with an ED electric connector at least two ECCP.

14. The portable apparatus for communicating power and data with an ED of claim 11, wherein the DSM includes an internal data module and directly communicates data between the internal memory module and the EEDCM.

15. The portable apparatus for communicating power and data with an ED of claim 11, the substantially monolithic, portable body further substantially encompassing an external memory storage interface module (EMSIM), the EMISM including an opening to receive a removable memory module and at least one electrical connector for electrical coupling to a removable memory module electrical connector and wherein the DSM directly communicates data between the EMSIM and an ED via the EEDCM and the first PDIM electrical connector at least two ECCD and via the EEDCM and WSMODEM including storing data received from an ED and providing stored data to an ED.

16. The portable apparatus for communicating power and data with an ED of claim 11, wherein the WSMODEM communicates wirelessly with an ED via one of a Bluetooth and WiFi compatible protocol.

17. The portable apparatus for communicating power and data with an ED of claim 13, the substantially monolithic, portable body further substantially encompassing a charging module coupled to the EEDCM and IEESM, the charging module charging the EESE via electrical energy received via one of the first PDIM and the second PDIM and the EEDCM.

18. The portable apparatus for communicating power and data with an ED of claim 13, wherein the first PDIM includes a first type universal serial bus (USB) mechanical and electrical interface and the second PDIM includes a second, different type universal serial bus (USB) mechanical and electrical interface.

19. The portable apparatus for communicating power and data with an ED of claim 13, wherein the second PDIM electrical connector further includes at least two different ECCD, the electrical connector having a mechanical shape configured to mechanically mate with an ED electrical connector and electrically couple the second PDIM electrical connector at least two ECCP with the ED electric connector at least two ECCP and electrically couple the second PDIM electrical connector at least two ECCD with the ED electric connector at least two ECCD.

20. The portable apparatus for communicating power and data with an ED of claim 19, wherein the second PDIM includes a micro universal serial bus (USB) mechanical and electrical interface coupled to a flexible cable, the second PDIM and flexible cable are shaped and sized to substantially seamlessly nest within a section of the substantially monolithic, portable body when not deployed and extend beyond the section of the substantially monolithic, portable body when deployed.

* * * * *